United States Patent [19]
Suda et al.

[11] Patent Number: 5,426,844
[45] Date of Patent: Jun. 27, 1995

[54] METHOD OF MAKING A ELECTROMAGNETIC ROTATION DETECTOR

[75] Inventors: Koichi Suda, Chita; Takeshi Fukaya, Tokai; Tadao Horiuchi, Toyoake, all of Japan

[73] Assignee: Aisan Kogyo Kabushiki Kaisha, Obu, Japan

[21] Appl. No.: 194,095

[22] Filed: Feb. 8, 1994

Related U.S. Application Data

[62] Division of Ser. No. 950,300, Sep. 24, 1992, Pat. No. 5,363,033.

[30] Foreign Application Priority Data

Sep. 30, 1991 [JP] Japan .................. 3-280649

[51] Int. Cl.$^6$ ............................................. H01F 41/00
[52] U.S. Cl. ..................... 29/606; 29/602.1; 324/207.15; 324/207.25
[58] Field of Search ................ 29/606, 602.1; 324/207.15, 207.25, 239, 262, 174

[56] References Cited

U.S. PATENT DOCUMENTS 4,931,728 6/1990 Hata et al. .
5,032,790 7/1991 Johnson .
5,039,942 8/1991 Buchschmid et al. .

FOREIGN PATENT DOCUMENTS 56-105847 8/1981 Japan .
63-152514 10/1988 Japan .

*Primary Examiner*—Carl E. Hall
*Attorney, Agent, or Firm*—Oliff & Berridge

[57] ABSTRACT

An apparatus for detecting a rotation of a rotational member. A core is disposed opposite to the rotational member. A coil of wire is disposed around the core. A permanent magnet, which is formed in a shaft of a symmetrically cut out cross section, is connected to the core. A bobbin is provided with a first cylindrical portion for receiving therein the core and winding the wire of the coil around the first cylindrical portion, and a second cylindrical portion integrally connected to the first cylindrical portion in co-axial relationship therewith. The second cylindrical portion is formed with cutout portions to provide a periphery corresponding to a periphery of the permanent magnet, and arranged to receive therein at least a part of the permanent magnet in co-axial relationship with the core. A case, which is formed in a cylindrical body for receiving therein the bobbin assembled with the core, permanent magnet and coil, defines a certain space between an outer surface of the second cylindrical portion at the cutout portions thereof and an inner surface of the case. A terminal electrically connected to the coil, is disposed in the space and fixed to the second cylindrical portion.

16 Claims, 5 Drawing Sheets

METHOD OF MAKING A ELECTROMAGNETIC ROTATION DETECTOR

This is a Division of application Ser. No. 07/950,300 filed Sep. 24, 1992, now U.S. Pat. No. 5,363,033.

BACKGROUND OF THE INVENTION

1. Field of the Invention

The present invention generally relates to a method of assembling an apparatus for detecting a rotation of a rotational member, and more particularly to a method of assembling an electromagnetic induction-type rotation detector which has a coil of wire disposed around a core with a permanent magnet connected thereto and which is arranged such that the top end surface of the core may face a rotational plane of the rotational member.

2. Description of the Related Art

An electromagnetic induction-type rotation detector has been known, as disclosed in Japanese Utility Model Laid-open Publication No. 56-105847, for example. In this publication, in view of the relationship between a magnetic substance and a rotating member, it is proposed that the magnetic substance is formed in a truncated conical shape so as to optimize a flux density over the whole length of the magnetic substance. That is, the rotation detector in the publication is provided with the magnetic substance formed in the truncated conical shape and a cylindrical bobbin which receives therein the magnetic substance and around which a wire is wound to form a coil.

In Japanese Utility Model Laid-open Publication No. 63-152514, in order to solve such a problem that a space for disposing a permanent magnet is restricted by connecting legs for connecting terminal plates to a coil, proposed is a rotation detector which has a permanent magnet disposed within a housing with an axis of the permanent magnet shifted against that of a core of a magnetic substance. It is described in the publication that the permanent magnet can be enlarged toward a portion having no connecting legs.

Although the space for disposing the connecting legs can be obtained by shifting the axis of the permanent magnet against that of the core as described above, the cross section of the housing has to be enlarged by a portion where the permanent magnet has been shifted. As a result, the overall size of the apparatus will become large. However, this kind of rotation detector including the housing (case) shall be formed as small as possible to be disposed in a limited space. If the axis of the permanent magnet is shifted against that of the core, the permanent magnet will have to be made large in size in order to obtain a predetermined flux density, which may also cause the overall size of the apparatus to become large.

SUMMARY OF THE INVENTION

Accordingly, it is an object of the present invention to provide a method of assembling an electromagnetic induction-type rotation detector in which a terminal may be disposed in parallel with a permanent magnet without increasing the cross section of a case for accommodating a bobbin assembled with a coil, a core and the permanent magnet, and in which the permanent magnet and the core may be disposed on a common axis.

In accomplishing the above and other objects, the present invention is directed to a method of assembling an apparatus for detecting a rotation of a rotational member. The apparatus includes a core which is disposed opposite to the rotational member, a coil of wire disposed around the core, a permanent magnet which is formed in a shaft of a symmetrically cut out cross section and which is connected to the core. The apparatus also includes a bobbin which has a first cylindrical portion for receiving therein the core and winding the wire of the coil around the first cylindrical portion, and which has a second cylindrical portion integrally connected to the first cylindrical portion in co-axial relationship therewith. The second cylindrical portion is formed with cutout portions to provide a periphery corresponding to a periphery of the permanent magnet. The second cylindrical portion is arranged to receive therein at least a part of the permanent magnet in co-axial relationship with the core. The apparatus includes a case which is formed in a cylindrical body for receiving therein the bobbin assembled with the core, permanent magnet and coil to define a certain space between an outer surface of the second cylindrical portion at the cutout portions thereof and an inner surface of the case. Then, a terminal is electrically connected to the coil, and the terminal is disposed in the space and fixed to the second cylindrical portion.

It is preferable that the permanent magnet has two longitudinally flat surfaces in parallel relationship with each other to provide the cutout portions, and curved surfaces connecting the flat surfaces. The inner surface of the second cylindrical portion of the bobbin is preferably formed to provide a periphery corresponding to the periphery of the permanent magnet, and the inner surface of the case is preferably formed with a circular cross section. The outer surface of the second cylindrical portion of the bobbin is preferably formed to provide a periphery corresponding substantially to the periphery of the permanent magnet, also having engaging projections and a columnar projection.

Preferably, the apparatus further includes a connector which is connected to the bobbin and provided with a first terminal having an extending portion extending toward the bobbin to be electrically connected to a second terminal fixed to the bobbin.

It is preferable that the second terminal is formed in a plate, and that the bobbin is formed on the outer surface thereof with a recess for receiving the second terminal.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENT

Figure 1:
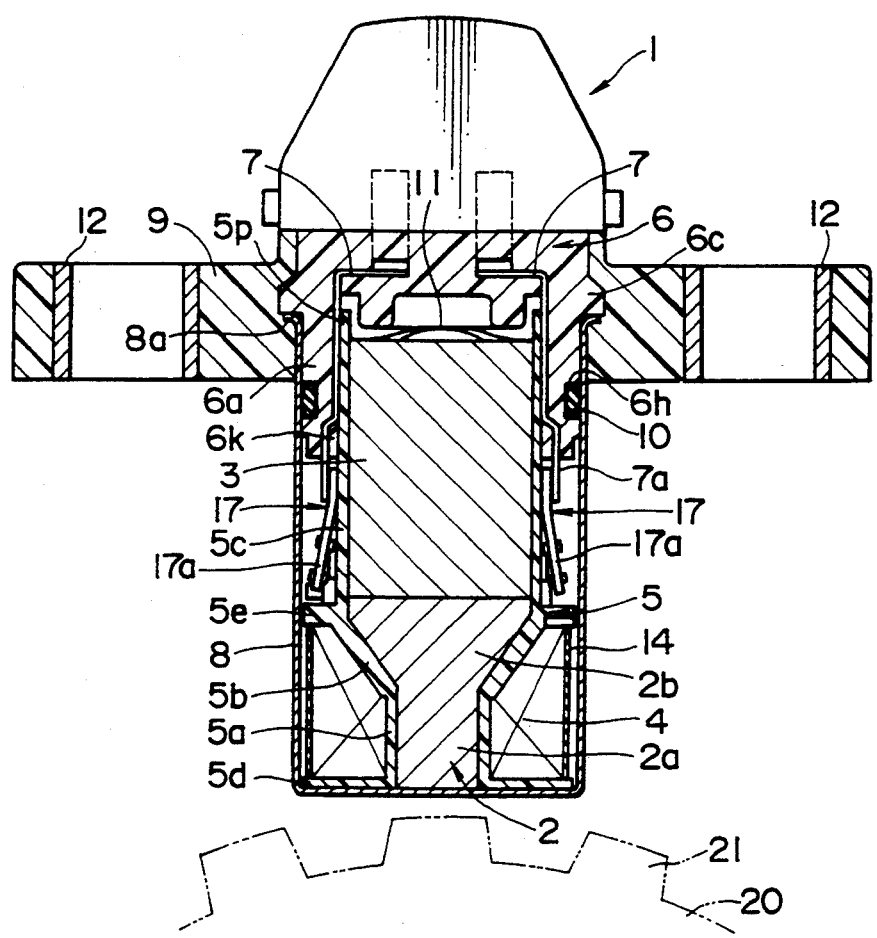
FIG. 1 is a sectional view of an electromagnetic pickup according to an embodiment of the present invention.

Referring to FIGS. 1-4, there is illustrated an electromagnetic induction-type rotation detector according to an embodiment of the present invention, which is adapted for a crank angle detecting apparatus for an internal combustion engine. That is, an electromagnetic pickup 1 is provided opposite to a rotor 20, or a rotational member, which is made of a magnetic material. The rotor 20 has a tooth portion 21 formed on a rotational plane as indicated by a double-dashed chain line in FIG. 1 and rotates in synchronism with an internal combustion engine (not shown).

The electromagnetic pickup 1 includes a core 2, a permanent magnet 3 connected to a base end portion of the core 2, and a bobbin 5 which accommodates the permanent magnet 3 and the core 2, and around which a coil 4 is disposed. The core 2 is made of a magnetic material, e.g., sintered metal of iron group, and provided with a tapered portion 2b formed in an approximately truncated conical shape and a columnar top end portion 2a formed so as to extend from a small-diameter end of the tapered portion 2b. The core 2 may be made so as to form a laminated body with a plurality of silicon steel plates stacked. The permanent magnet 3 is formed in a columnar shape of approximately oval cross section having two longitudinally flat portions formed in parallel with each other and two curved surface portions connecting these flat portions. In other words, the permanent magnet 3 takes a form of a columnar body having two cutout portions in its axial direction. The bottom end of the tapered portion 2b of the core 2 connected to the permanent magnet 3 is also formed in the same shape as the cross section of the permanent magnet 3.

Figure 2:
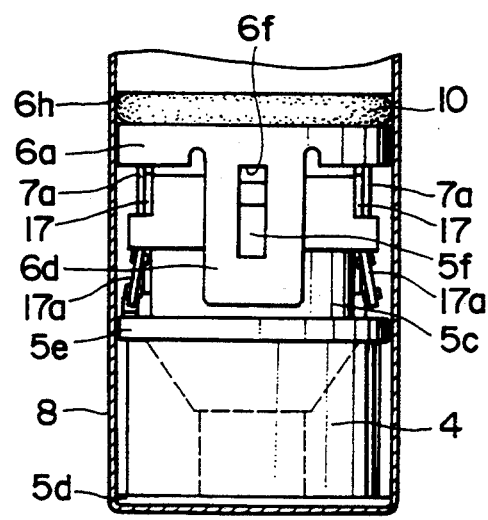
FIG. 2 is a front view of a bobbin and a part of a cylindrical body of a connector according to an embodiment of the present invention.
Figure 3:
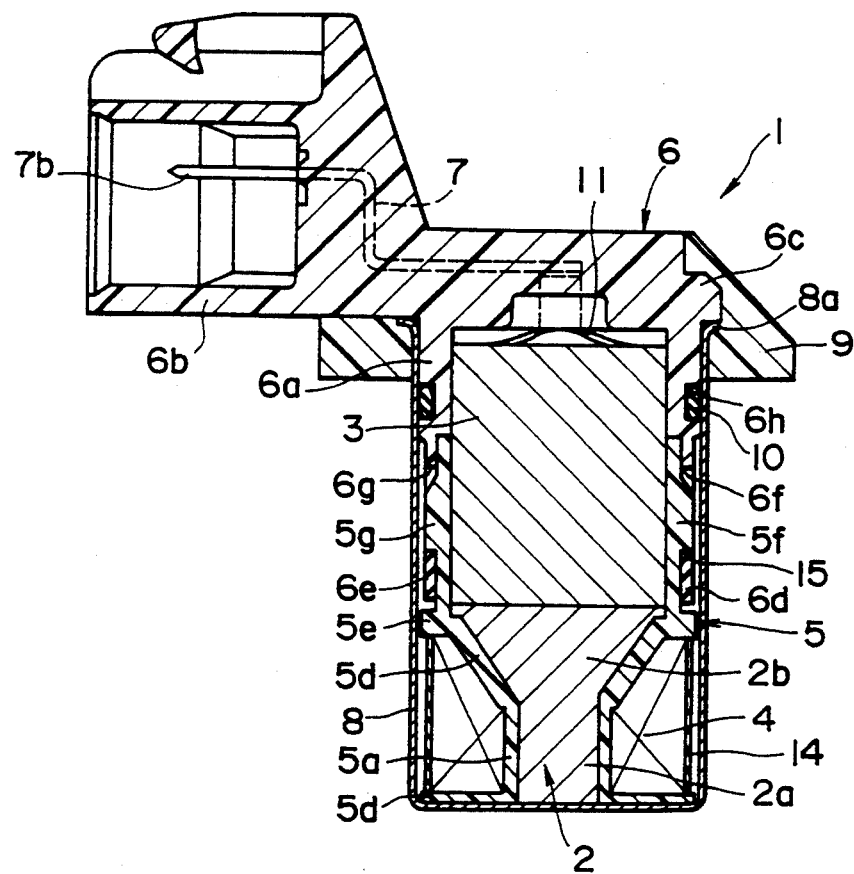
FIG. 3 is a sectional view of an electromagnetic pickup according to an embodiment of the present invention.

The bobbin 5 is made of synthetic resin and formed in a cylindrical body having a small-diameter cylindrical portion 5a, a tapered portion 5b and a large-diameter cylindrical portion 5c. In the bobbin 5, a hollow portion having a circular cross section with a small diameter, a tapered hollow portion, and a hollow portion having an approximately oval cross section with a large diameter are formed in sequence, so that the core 2 and the permanent magnet 3 are accommodated in those hollow portions. Flange portions 5d and 5e are integrally formed around the top end of the cylindrical portion 5a of the bobbin 5 and around the large-diameter end of the tapered portion 5b, respectively. A winding or wire of the coil 4 is wound around the bobbin 5 between these flange portions 5d and 5e, and an insulating tape 14 is wound around its periphery. Thus, the cylindrical portion 5a and the tapered portion 5b constitute a first cylindrical portion according to the present invention, and the cylindrical portion 5c constitutes a second cylindrical portion. On the external surface of the cylindrical portion 5c of the bobbin 5, approximately rectangular engaging projections 5f and 5g are axially formed to protrude outwardly at radially opposite positions, as shown in FIGS. 2 and 3. The details of other structures of the bobbin 5 will be described hereinafter.

Figure 9:
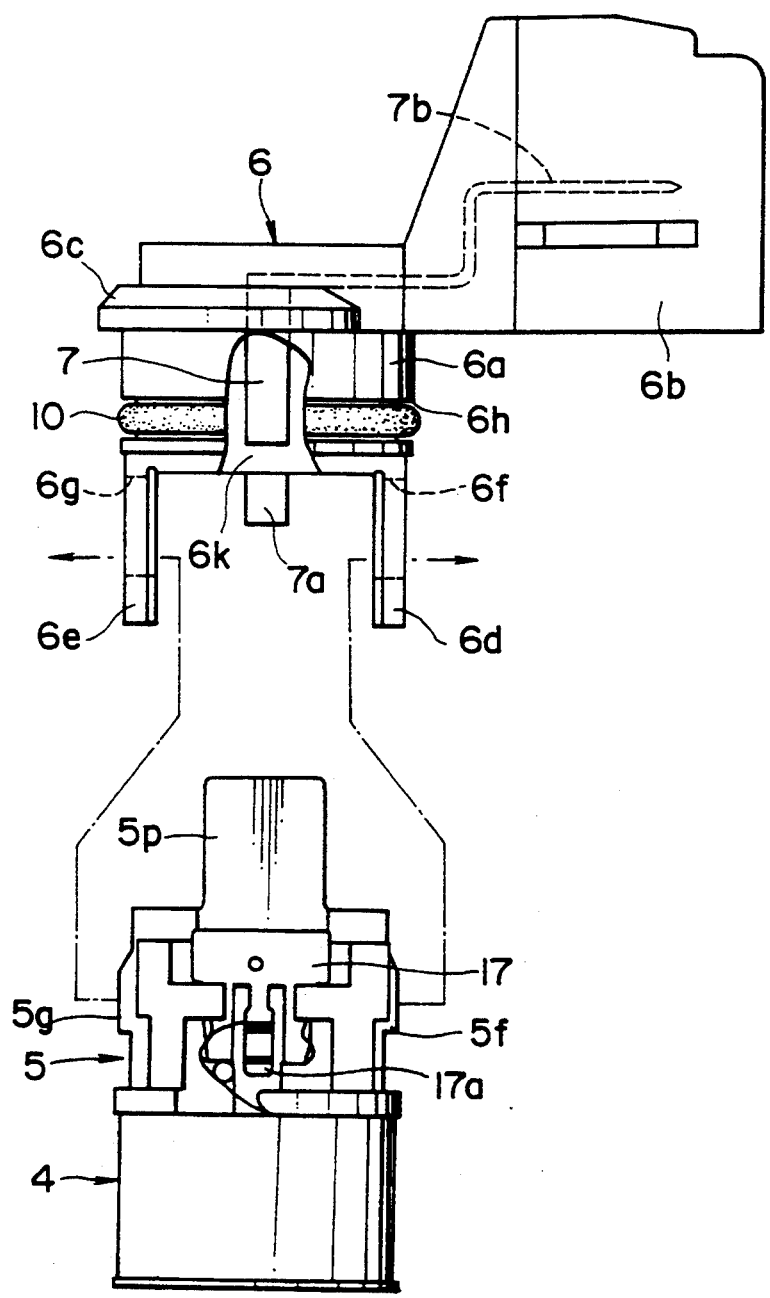
FIG. 9 is a side view illustrating a bobbin and a connector connected thereto, with a part of the connector partially cut out, according to an embodiment of the present invention.

As shown in FIGS. 1 and 3, a connector 6 is molded in a shape as shown in FIG. 9, with a pair of terminals 7, 7 inserted in the molded resin to constitute a first terminal according to the present invention. The connector 6 includes a cylindrical portion 6a made in the form of a cylinder with a bottom to provide a concave portion with an approximately oval cross section and a connecting portion 6b in the form of a cylinder with a bottom to provide a concave portion with an approximately rectangular cross section, wherein their bottoms are jointed such that each axis is substantially orthogonal to each other. An annular groove 6h is formed on the outer peripheral surface of the cylindrical portion 6a in the vicinity of its open end. And an O-ring 10 is disposed in the annular groove 6h. An annular stepped portion 6c is formed on the outer peripheral surface of the cylindrical portion 6a in the vicinity of its bottom.

One end of the terminal 7 extends from the cylindrical portion 6a to provide an extending portion 7a and the other end extends into the concave portion of the connecting portion 6b to provide a connecting terminal 7b. As shown by cutting off the side wall of the connector 6 in FIG. 9, the terminal 7 reveals itself in part on the inner surface of the cylindrical portion 6a, while the terminal 7 is supported by a support portion 6k at its open end. Since the annular groove 6h is formed on the outer surface of the cylindrical portion 6a, if it is designed to embed the whole part of terminal 7 in the side wall of the cylindrical portion 6a, it is difficult to hold the terminal 7 when the cylindrical portion 6a is molded. Consequently, the terminal 7 may also reveal itself on the side of the annular groove 6h, i.e, outer surface of the cylindrical portion 6a. In order to avoid this, it is necessary to increase the thickness of the side wall of the cylindrical portion 6a. However, by increasing the thickness, the outer diameter is enlarged to counteract the demand of miniaturization. In the present embodiment, therefore, the terminal 7 is arranged to reveal itself on the inner surface of the cylindrical portion 6a. That is, the terminal 7 is embedded, through an insert molding method, with the terminal 7 supported at the inner surface of the cylindrical portion 6a, and the exposed portion of the terminal 7 is insulated with extending portions 5p, 5q of the bobbin 5 which will be described later. Thus, the terminal 7 can be built in the connector 6 without causing the cylindrical portion 6a to be large in size as a whole.

An extending portion 6d with an approximately rectangular front view extending from the open end of the cylindrical portion 6a in its axial direction is formed integrally therewith, and an extending portion 6e wider than the extending portion 6d is formed as well. In these extending portions 6d, 6e, rectangular engaging holes 6f, 6g are bored respectively, as shown in FIGS. 2 and 3. The engaging projections 5f, 5g of the bobbin 5 engage with these engaging holes 6f, 6g to provide a configuration for connecting the bobbin 5 to the connector 6, i.e., so-called snapfit-structure. Thus, the core 2 and the permanent magnet 3 are accommodated within the hollow portions of the bobbin 5 and the cylindrical portion 6a. Further, a spring washer 11 is provided between the end surface of the permanent magnet 3 and the bottom surface of the cylindrical portion 6a, so that the core 2 and the permanent magnet 3 are pressed toward the tapered portion 5b.

Figure 4:
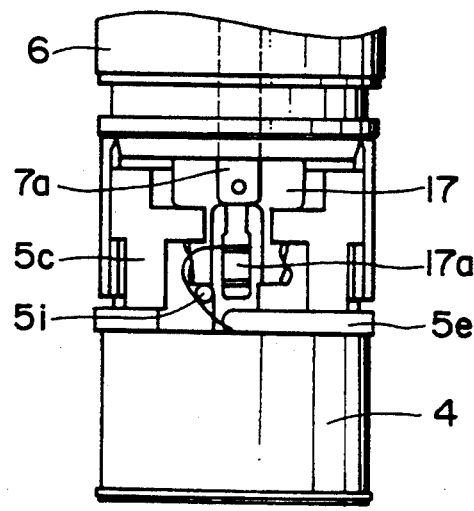
FIG. 4 is a side view of a bobbin and a part of a cylindrical body of a connector according to an embodiment of the present invention.

As shown in FIGS. 2 and 4, a pair of terminals 17, 17, which constitute a second terminal according to the present invention, are fixed to opposite sides of the cylindrical portion 5c of the bobbin 5, and each end portion of the wire of the coil 4 is wound around each connecting portion 17a and soldered. The terminals 17, 17 are provided so as to overlap with the extending portions 7a, 7a of the terminals 7, 7 when the bobbin 5 is coupled with the cylindrical portion 6a as described above, and both are connected together by means of projection welding. Then, the insulating tape 15 is wound around the connected portion as shown in FIG. 3 (omitted in FIGS. 1, 2 and 4).

Figure 5:
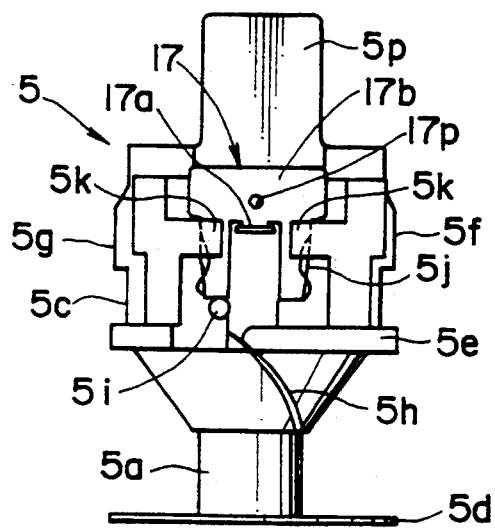
FIG. 5 is a side view of a bobbin according to an embodiment of the present invention.
Figure 6:
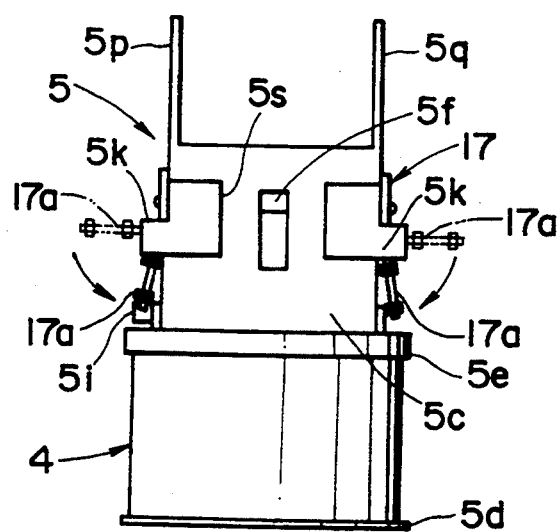
FIG. 6 is a front view of the bobbin as shown in FIG. 5 with a coil disposed therearound.

Referring now to FIGS. 5–9, the details of the bobbin 5 and the cylindrical portion 6a of the connector 6 will be described in accordance with the assembly sequence. FIG. 5 illustrates a side view of the bobbin 5 provided with the terminal 17, wherein a connecting portion 17a thereof is bent and erected in a radial direction of the bobbin 5, as shown in FIG. 6 by a double-dashed chain line. As apparently shown in FIG. 5, a groove 5h is formed on the tapered portion 5b of the bobbin 5 to extend from a small-diameter end thereof to a large-diameter end thereof. A flange portion 5e formed on the large-diameter end of the tapered portion 5b is partially cut out in the vicinity of an end of the groove 5h. Furthermore, a columnar projection 5i is integrally formed on the outer surface of the cylindrical portion 5c to extend in a radial direction thereof, at a position on the extending line of the groove 5h.

Figure 7:
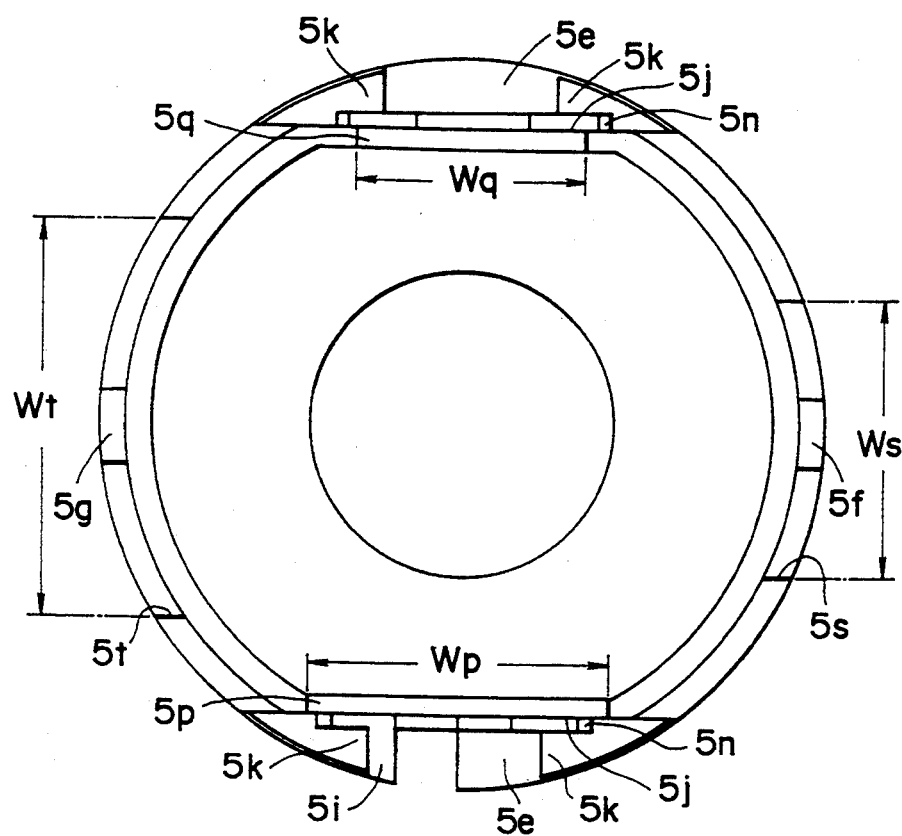
FIG. 7 is a plan view of the bobbin as shown in FIG. 5.

The hollow portion with the approximately oval cross section is formed in the cylindrical portion 5c, as described before, so that its inner surface has two flat surfaces formed opposite to each other and two curved surfaces formed opposite to each other, as shown in FIG. 7. Whereas, each external shape of the flange portions 5d, 5e is formed in a circular shape, and a case 8 is formed in a circular cross section as well. In the case where a predetermined substantially uniform thickness is secured for the cylindrical portions 5c around the whole circumference of its hollow portion, if the outside of the flat inner surface portion of the cylindrical portion 5c is formed with an approximately flat surface, a certain space can be formed between the outer surface of the cylindrical portion 5c and the inner surface of the case 8, and therefore, it is so arranged that the terminal 17 is provided in the space. In addition, the extending portions 5p, 5q forming a rectangular plate respectively are integrally formed to extend in the axial direction from two approximately flat outer surfaces of the cylindrical portion 5c, respectively. The width Wp of the extending portion 5p is formed greater than the width Wq of the extending portion 5q.

Figure 8:
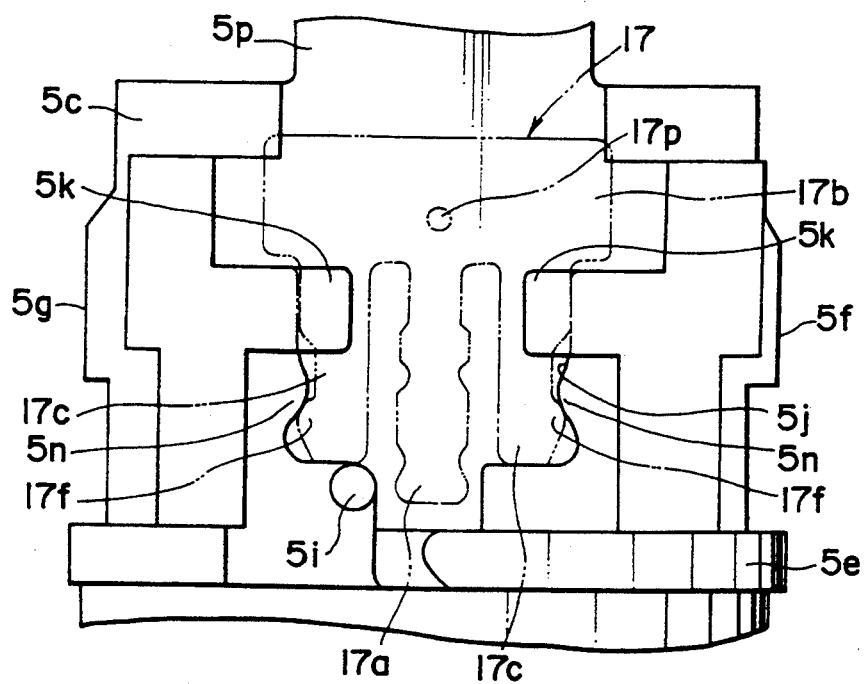
FIG. 8 is a side view enlarging a portion for holding a terminal in a bobbin according to an embodiment of the present invention.

Referring to FIG. 8, the terminal 17 is depicted by a double-dashed chain line. The connecting portion 17a for connecting the wire of the coil 4 extends from the center of a body portion 17b to form a T-letter shape, and a pair of leg portions 17c, 17c extend on opposite sides of the connecting portion 17a and in parallel therewith. On these leg portions 17c, 17c, formed are engaging projections 17f, 17f extending orthogonally to the axis of each leg portion and opposite to each other. In addition, a projection 17p for use in projection welding is formed on approximately center of the body portion 17b.

A concave portion or recess 5j for receiving the terminal 17 is formed in each of two substantially flat outer surfaces of the cylindrical portion 5c. And, a pair of holding portions 5k, 5k are integrally formed with the cylindrical portion 5c to extend in the circumferential direction of the portion 5c for covering a part of the recess 5j. Thus, a gap approximately equal to the thickness of the terminal 17 received in the recess 5j is formed between the substantially flat outer surface of the cylindrical portion 5c and the holding portion 5k, as shown in FIG. 7, so that the terminal 17 is inserted into the gap and held by the holding portions 5k, 5k. Within the recess 5j of the bobbin 5 for receiving the terminal 17, engaging portions 5n, 5n having taper surfaces are formed facing each other for engaging with the engaging projections 17f, 17f of the terminal 17, respectively.

Thus, as shown in FIG. 5, the terminal 17 is received in the recess 5j with the leg portion 17a bent at an approximately right angle to the flat surface of the body portion 17b. When the engaging projection 17f goes over one taper surface of the engaging portion 5n against the elastic biasing force of each leg portion 17c, the engaging projection 17f comes to engage with the other taper surface, the terminal 17 is restricted from moving upward, downward, rightward and leftward, and retained by the holding portions 5k, 5k, so that the terminal 17 is held within the recess 5j in a stable state.

In order to wind the wire of the coil 4 around the bobbin 5, the wire is first wound counterclockwise around the end portion of the connecting portion 17a (left side in FIG. 6) Then, the wire is wound counterclockwise around the base end of the connecting portion 17a, and is wound around projection 5i. Then, the wire is guided to the cylindrical portion 5a through the groove 5h. Then, the wire is wound clockwise around the cylindrical portion 5a and the taper portion 5b between the flange portions 5d and 5e in sequence to form the coil 4. Which side of the terminals 17, 17 is the side to begin winding the wire is determined in dependence upon the width of the extending portions 5p and 5q. That is, since the extending portion 5p having a width wider than that of the extending portion 5q is provided for determining the side to begin winding the wire in the present embodiment, the beginning side can be automatically discriminated by the position of the extending portion 5p when setting up the bobbin 5 in a winding machine (not shown).

When the wire is wound at a predetermined number of turns, the wire is derived from the cut-out of the flange portion 5e on the back side of FIG. 5 and wound around the terminal 17 on the back side (terminal 17 on the right side of FIG. 6). After the wire is wound around the bobbin 5, only the wound portion of the connecting portion 17a of the terminal 17 is soldered. Then, the connecting portion 17a is bent to the side of the cylindrical portion 5c as indicated by an arrow in FIG. 6 and becomes substantially in parallel with the axis of the bobbin 5. At this time, since the wire on the beginning side of the coil 4 is wound via the projection 5i as shown in FIG. 9, the wire is not located under the connecting portion 17a, and therefore, the wire is not pressed under the connecting portion 17a. With respect to the terminal 17 to which the terminating side of the wire is connected, the cutout of the flange portion 5e is provided on the right side of the connecting portion 17a, the wire is derived from the right side of the connecting portion 17a to the left side for returning it and wound counterclockwise around the connecting portion 17a, and therefore, the wire is never located under the connecting portion 17a. For this reason, no projection such as the projection 5i is provided at the terminating side of the wire, but the projection may also be provided on the terminating side.

After the wire is wound to form the coil 4 as described above, the insulating tape 14 is wound around the outer periphery of the coil 4. As shown in FIG. 9, the O-ring 10 is disposed on the connector 6, then the core 2, the permanent magnet 3 and the spring washer 11, which are not shown in FIG. 9, are accommodated in the bobbin 5, and then the connector 6 is connected to the bobbin 5. That is, the extending portions 5p and 5q of the bobbin 5 are received in the connector 6 to face the terminals 7, 7 disposed on opposite sides of the connector 6, and the engaging projections 5f and 5g are respectively engaged with the engaging holes 6f and 6g by means of so-called snap action of the extending portions 6d and 6e of the connector 6. Since the extending portion 6e of the connector 6 is formed wider than the extending portion 6d, and the width Wt of a recess 5t formed on the outer surface of the bobbin 5 is greater than the width Ws of a recess 5s formed on the opposite side to the recess 5t as shown in FIG. 7, any misassembly can be avoided, and the terminals 7, 7 are connected to the terminals 17, 17 respectively in a predetermined combination with each other. Then, each terminal 7 is connected to its corresponding terminal 17 by means of projection welding, and the insulating tape 15 (shown in FIG. 3) is wound around the connected portions. Thus, the bobbin 5 is appropriately and securely connected to the connector 6, mechanically and electrically. In addition, the terminals 7, 7 are brought into contact with the extending portions 5p, 5q respectively to be insulated satisfactorily.

The case 8 as shown in FIGS. 1-3 is provided so as to surround the cylindrical portion 6a of the connector 6 and the bobbin 5 assembled as described above. The case 8 has a cylindrical body with a bottom which is made of metal, e.g., stainless steel, and which is pressed onto the outer surface of the cylindrical portion 6a between the annular groove 6h and the stepped portion 6c, until the end surface of the top end portion 2a of the core 2 is brought into contact with the bottom surface of the cylindrical body. An open end 8a of the case 8 is extended outwardly and the flat portion of its top end is brought into contact with the stepped portion 6c. A flange 9 is formed by means of solid molding of synthetic resin so as to surround the stepped portion 6c of the connector 6 and the open end 8a of the case 8. In the flange 9, a pair of metal collars 12, 12 as shown in FIG. 1 are embedded by means of insert-molding.

In operation, according to the electromagnetic pickup 1 as shown in FIG. 1, a predetermined magnetic flux distribution is formed in the core 2 by the permanent magnet 3. Since the core 2 and the permanent magnet 3 are disposed on a common axis, and the sectional area of the top end portion 2a of the core 2 is smaller than that of the permanent magnet 3, the flux leaked from the top end portion 2a is limited to provide an optimum magnetic flux density. Thus, when the rotor 20 rotates, the magnetic flux distribution varies at each time when the tooth portion 21 faces the tip end surface of the core 2. Consequently, the magnetic flux quantum crossing the coil 4 is varied, and the direction of the output is opposite to each other depending upon the position of the rotor 20, close to, or away from the tooth portion 21, so that the alternating current is induced in the coil 4 in accordance with the rotation of the rotor 20 by the electromagnetic induction effect and generated as a signal for representing a rotational frequency.

Although the invention has been described in connection with preferred embodiments thereof, it will be appreciated by those skilled in the art that additions, substitutions, modifications, and deletions not specifically described, may be made without departing from the spirit and scope of the invention as defined in the appended claims.

What is claimed is:

1. A method of assembling a rotation detector comprising the steps of:

forming a core;

inserting said core into a bobbin, said bobbin having a first cylindrical portion for receiving said core and a second cylindrical portion formed with cutout portions, the second cylindrical portion having a terminal connected thereto;

disposing a coil around said first cylindrical portion of said bobbin;

inserting a columnar permanent magnet having cutout portions corresponding to the cutout portions of said bobbin in said second cylindrical portion of said bobbin to connect said magnet to said core;

connecting said terminal to said coil; and subsequently inserting said bobbin assembled with said core, said permanent magnet and said coil into a cylindrical case, said case defining a space between an outer surface of said second cylindrical portion of said bobbin at said cutout portions and an inner surface of said case, wherein the terminal is disposed in said space.

2. The method of claim 1, further comprising the steps of:

forming a column portion and a tapered portion on said core, the tapered portion integrally connected at a small diameter portion to said column portion; and connecting said magnet to a large diameter portion of said tapered portion.

3. The method of claim 1, further comprising the steps of:

forming a pair of flanges on said first cylindrical portion in spaced relationship with each other; and winding wire of said coil between said flanges.

4. A method of assembling a rotation detector comprising the steps of:

forming a core;

inserting said core into a bobbin, said bobbin having a first cylindrical portion for receiving said core, a second cylindrical portion formed with cutout portions and a connector, the connector provided with a first terminal having an extending portion extending from said connector towards said bobbin;

disposing a coil around said first cylindrical portion of said bobbin;

connecting a second terminal between said coil and said first terminal;

inserting a columnar permanent magnet having cutout portions corresponding to the cutout portions of said bobbin in said second cylindrical portion of said bobbin to connect said magnet to said core; and subsequently inserting said bobbin assembled with said core, said permanent magnet and said coil into a cylindrical case, said case defining a space between an outer surface of said second cylindrical portion of said bobbin at said cutout portions and an inner surface of said case, wherein said second terminal is disposed in said spaced and fixed to said second cylindrical portion.

5. The method of claim 4, further comprising the steps of:
    forming a connecting portion on said second terminal, the connecting portion extending adjacent to said coil; and
    connecting said extending portion to said second terminal.

6. The method of claim 5, further comprising the steps of:
    forming said second terminal as a plate;
    forming a recess on said bobbin; and
    inserting said second terminal in said recess.

7. The method of claim 6, further comprising the steps of:
    forming a body portion, a connecting portion and a pair of leg portions on said second terminal, the connecting portion extending from the center of said body portion to form a T-letter shape and said leg portions extending from said body portion on opposite sides of said connecting portion in parallel relationship therewith; and
    forming holding portions on said bobbin, said holding portions extending from opposite sides of said recess covering a part of said recess and holding said leg portions of said second terminal in said recess.

8. The method of claim 7, further comprising the steps of:
    forming an engaging projection on each of said leg portions;
    forming engaging portions in said recess of said bobbin; and
    engaging said engaging projections with said engaging portions in an axial direction of said bobbin.

9. The method of claim 8, further comprising the step of overlapping and connecting said body portion of said second terminal to said extending portion of said first terminal.

10. The method of claim 5, further comprising the steps of:
    forming a pair of extending portions in said bobbin, said extending portions extending axially from opposite sides of said second cylindrical portion;
    forming a cylindrical portion in said connector;
    inserting said extending portions of said bobbin into said cylindrical portion of said connector;
    embedding said first terminal in said connector with a part of said first terminal exposed within said cylindrical portion of said connector; and
    positioning at least one of said extending portions of said bobbin to cover the exposed part of said first terminal.

11. The method of claim 10, further comprising the steps of:
    forming an angular groove on an outer surface of said second cylindrical portion of said connector at a position where said first terminal is exposed within said cylindrical portion;
    disposing an O-ring in said angular groove of said connector;
    fitting said case onto said cylindrical portion of said connector with said O-ring provided therebetween.

12. The method of claim 11, further comprising the step of forming a flange covering at least an end portion of said case in said cylindrical portion of said connector.

13. The method of claim 4, further comprising the steps of:
    forming engaging projections on an outer surface of said bobbin;
    forming extending portions extending axially on said connector;
    forming holes in said extending portions; and
    engaging said holes in said extending portions with said engaging projections of said bobbin.

14. The method of claim 13, wherein said engaging projections of said bobbin include a first engaging projection and a second engaging projection wider than said first engaging projection and said extending portions of said connector include a first extending portion having a first hole and a second extending portion having a second hole, further comprising the steps of:
    engaging said first engaging projection with said first hole; and
    engaging said second extending portion with said second hole.

15. The method of claim 14, further comprising the steps of:
    forming a pair of extending portions in said bobbin, said extending portions extending axially from opposite sides of said second cylindrical portion;
    forming a cylindrical portion in said connector;
    inserting said extending portions of said bobbin in said cylindrical portion of said connector;
    embedding said first terminal in said connector with a part of said first terminal exposed within said cylindrical portion of said connector, wherein at least one of said extending portions of said bobbin covers the exposed part of said first terminal and said engaging projections of said bobbin are formed between said extending portions of said bobbin along a periphery thereof and said extending portions of said connector are disposed between said extending portions of said bobbin.

16. The method of claim 15, further comprising the step of disposing a spring washer within said connector between said magnet and said connector for biasing said magnet and said connector to a bottom of said bobbin.

* * * * *